(12) United States Patent
Berger et al.

(10) Patent No.: US 6,167,685 B1
(45) Date of Patent: Jan. 2, 2001

(54) WINDROWER HEADER SPEED CONTROL

(75) Inventors: John G. Berger, Landisville; Garth H. Bulgrien, Ephrata, both of PA (US)

(73) Assignee: New Holland North America, Inc., New Holland, PA (US)

( * ) Notice: Under 35 U.S.C. 154(b), the term of this patent shall be extended for 0 days.

(21) Appl. No.: 09/275,404

(22) Filed: Mar. 24, 1999

(51) Int. Cl.$^7$ ................................................ A01D 69/06
(52) U.S. Cl. ................................. 56/10.2 A; 56/10.2 G; 56/11.1
(58) Field of Search ........................ 56/10.2 A, 10.2 R, 56/11.1, 10.2 G, 10.9, 10.8, 10.7, DIG. 15; 460/1, 6

(56) References Cited

U.S. PATENT DOCUMENTS

| | | | |
|---|---|---|---|
| 4,009,556 | * | 3/1977 | Molzahn ................................ 56/10.7 |
| 4,043,099 | * | 8/1977 | Cheatum ............................... 56/10.9 |
| 4,337,611 | * | 7/1982 | Mailander et al. ..................... 56/10.2 |
| 4,527,241 | * | 7/1985 | Sheehan et al. ....................... 364/424 |
| 4,967,544 | * | 11/1990 | Ziegler et al. ......................... 56/10.2 |
| 5,335,487 | * | 8/1994 | Murakawa et al. .................... 56/10.5 |
| 5,394,678 | * | 3/1995 | Lonn et al. ........................ 56/10.2 H |
| 5,633,452 | * | 5/1997 | Bebernes ................................. 73/37 |
| 5,657,224 | * | 8/1997 | Lonn et al. ..................... 364/424.034 |
| 5,878,557 | * | 3/1999 | Wyffels et al. ........................ 56/13.5 |
| 5,901,535 | * | 5/1999 | Dückinghaus et al. ............ 56/10.2 G |

* cited by examiner

Primary Examiner—Robert E. Pezzuto
Assistant Examiner—Arpad Fabian Kovacs
(74) Attorney, Agent, or Firm—Griffin & Szipl, P.C.

(57) ABSTRACT

A system for controlling the header speed of a windrower to a set point includes a variable displacement pump producing a variable outflow of hydraulic fluid for driving the header via two hydraulic motors, the system being characterized in that the pump is driven by a pulse width modulated (PWM) signal having a duty cycle that is dependent on the speed and the acceleration of the header. When the header speed falls outside a window or range of speeds centered at the set point, header speed is used to modify the duty cycle of the PWM signal and bring the header speed back within the window. In addition, the duty cycle of the PWM signal is decremented if the acceleration of the header exceeds a threshold and the header includes disk type cutters.

8 Claims, 3 Drawing Sheets

WINDROWER HEADER SPEED CONTROL

FIELD OF THE INVENTION

The present invention relates to control of the speed of the header of a windrower. More particularly, the invention provides for microprocessor control of header speed based on both the speed and the acceleration or rate of change in header speed.

BACKGROUND OF THE INVENTION

The header of a windrower or mower/conditioner typically includes a cutter which may take the form of sickle-bar or a plurality of disk cutter knives for cutting a crop material such as hay. The cut crop is then passed through conditioning rolls after which it is deposited in a windrow on a field. Windrowers having the disk type cutters present a problem in that when the windrower moves from an area having heavy crop to an area having light or no crop, such as when the windrower moves from the area of crop into the headlands of a field, the lightened load permits a considerable increase in header speed. An operator may rapidly turn the windrower in the headlands so that it is ready to reenter the crop area rather quickly to begin cutting the next swath. However, if the header speed is too high, the knives may blow the crop material away from the cutting mechanism and the operator must wait until the over speed has been corrected before moving back into the crop area. Therefore, it is desirable that the over speed condition be corrected as rapidly as possible, not only to save operator time and reduce operator irritation, but also reduce fuel consumption and wear on the windrower.

Currently, header speed is sensed to develop a control signal tending to keep the header speed within a window or range centered on a speed selected by the operator via a control console or panel. Since no control signal is developed until the sensed speed falls outside the window, there is a considerable delay in correcting an over speed condition. In some windrowers the output of a proportional hydraulic pump drives the header drive motors and the response time of the pump adds to the delay.

SUMMARY OF THE INVENTION

An object of the present invention is to overcome the problems of the prior art by providing a header speed control system which responds more quickly than the prior art to changes in header speed.

A further object of the invention is to provide a closed loop header speed control system wherein the control signal for controlling the header to a set point speed is determined by both header speed and header acceleration.

Another object of the invention is to provide a header speed control system for controlling the speed of a header in a windrower to a set point speed, the system including a source of variable drive power producing a variable power output for driving the header, a header speed sensor for sensing the speed of the header and a controller responsive to the header speed sensor for developing a control signal to control the power output of the source of variable drive power, the control signal being a function of header speed and header acceleration.

According to the invention, a system for controlling the header speed of a windrower to a set point includes a proportional or variable displacement pump producing a variable outflow of hydraulic fluid for driving the header via at least one hydraulic motor, the system being characterized in that the pump is driven by a pulse width modulated (PWM) signal having a duty cycle that is dependent on the speed and the acceleration of the header. When the header speed falls outside a window or range of speeds centered at the set point, header speed is used to modify the duty cycle of the PWM signal and bring the header speed back within the window. In addition, if the header includes a disk type cutter, the duty cycle of the PWM signal is decremented if the acceleration of the header exceeds a threshold and the header includes disk type cutters. This is done even though the header speed is within the window.

Other objects and advantages of the invention will become obvious upon consideration of the following description and the accompanying drawings.

DESCRIPTION OF THE INVENTION

Although the principles of the invention are applicable to any windrower utilizing disk cutters as the crop cutting means, the invention will be described with reference to the model HW340 currently marketed by New Holland North America, New Holland, PA. This particular windrower is a self-propelled machine and is designed such that either a sickle-bar or disk cutters may be used as the crop cutting means.

Figure 1:
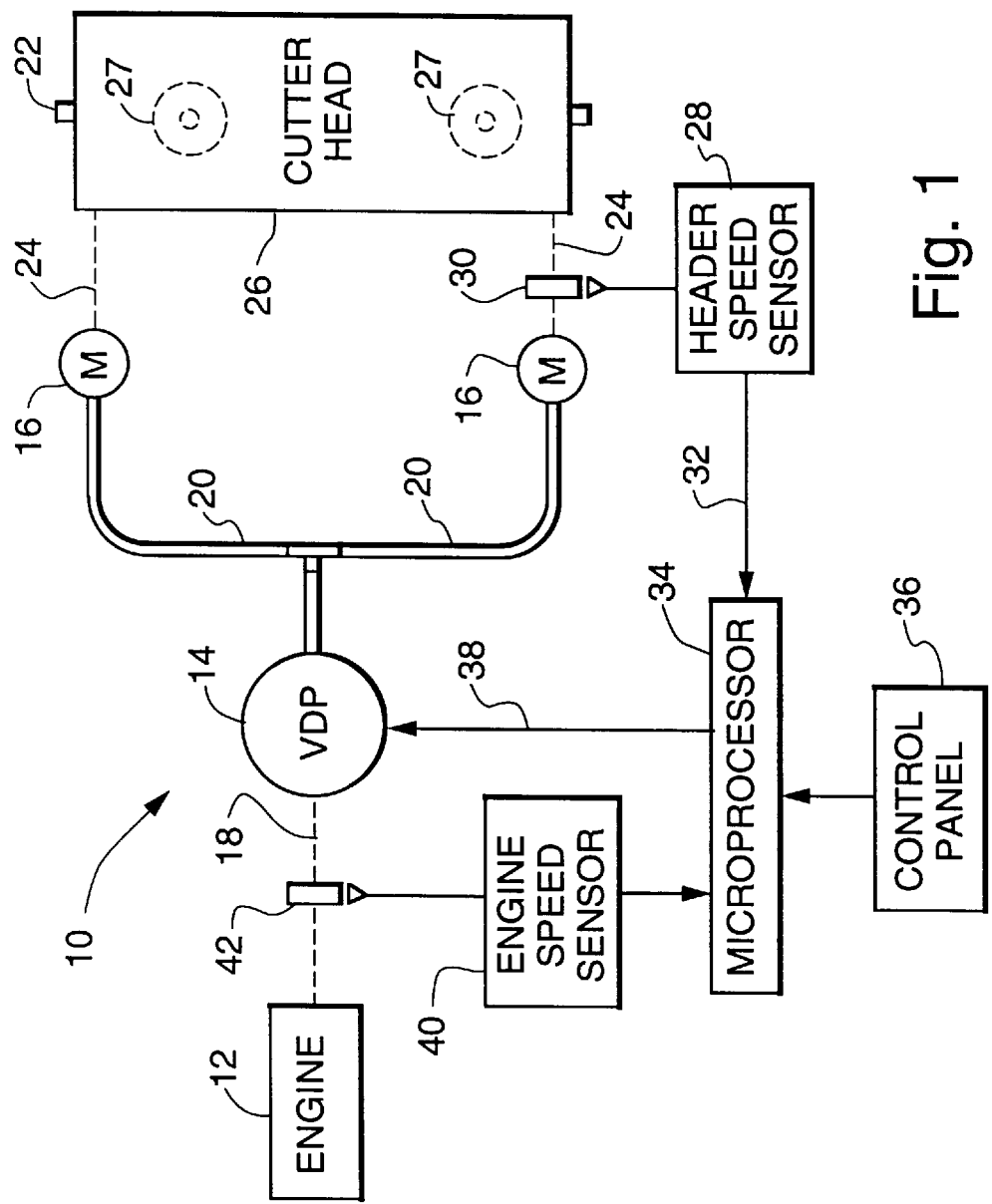
FIG. 1 is a schematic electrical/hydraulic diagram of a header speed control system; and, FIGS. 2A and 2B comprise a flow diagram illustrating a control algorithm executed by the microprocessor of FIG. 1 to develop a header speed control signal based on the speed and acceleration of the header.

As shown in FIG. 1, the header drive system for the model HW340 windrower comprises an engine or motor 12, a source of variable drive power such as a proportional or variable displacement hydraulic pump 14, and first and second hydraulic motors 16. Engine 12 drives pump 14 through a mechanical linkage 18 and also propels the windower, but separate engines may be used. The output of pump 14 is connected via hydraulic lines 20 to the inputs of two hydraulic motors 16. Motors 16 drive opposite ends of a shaft 22 via mechanical linkages schematically illustrated at 24 so as to drive the disk cutters 27 (only two shown) in header 26.

A header speed sensor 28 is provided for sensing the current speed of header 26. The speed sensor may be any form of sensor for sensing header speed but preferably comprises a magnetic sensor for sensing the leading and trailing edges of holes or slots on a wheel or gear 30 that is mounted so as to rotate with the mechanical linkage 24.

Each time sensor 28 senses the edge of a hole in wheel 30, it generates an interrupt signal on a lead 32 to interrupt a controller 34 which may be a programmable microprocessor. These interrupts occur between about 31 and 950 times per second depending on the header speed. The microprocessor includes a continuously running time stamp counter (not shown) and each time an interrupt signal is received an interrupt routine saves the value in the counter as a time stamp.

A console or operator control panel 36 is connected to the microprocessor 34 so that an operator may select a desired header speed or set point, typically in the range of about 1600 to 3200 rpm depending on crop and field conditions. Generally speaking, and as later explained in detail, the microprocessor generates a pulse width modulated (PWM)

control signal at a frequency of about 444 Hz, this signal being applied to pump 14 via a lead 38 to vary the outflow of hydraulic fluid from the pump so as to maintain the header speed at the set point.

Figure 2A:
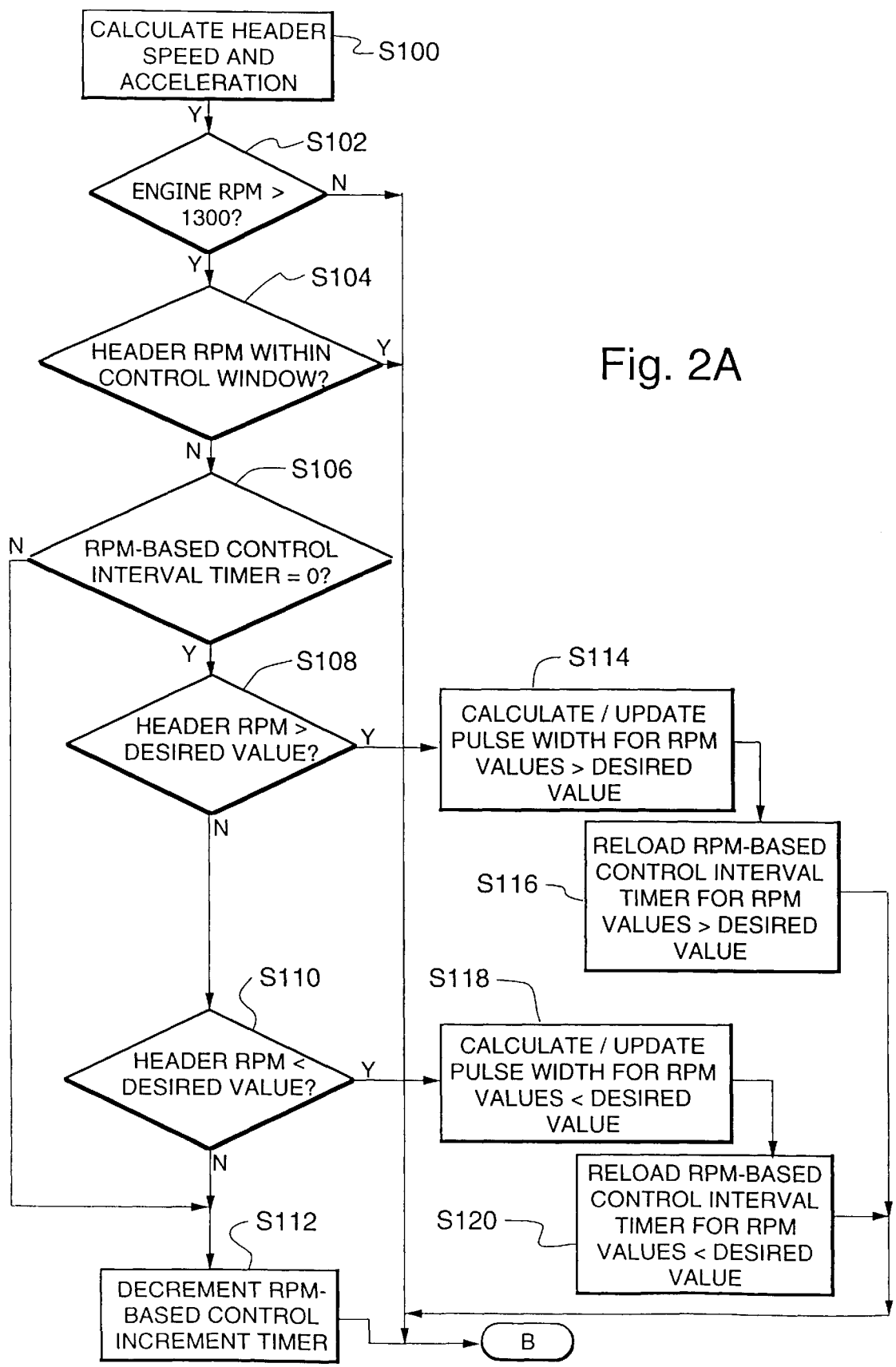
Figure 2B:
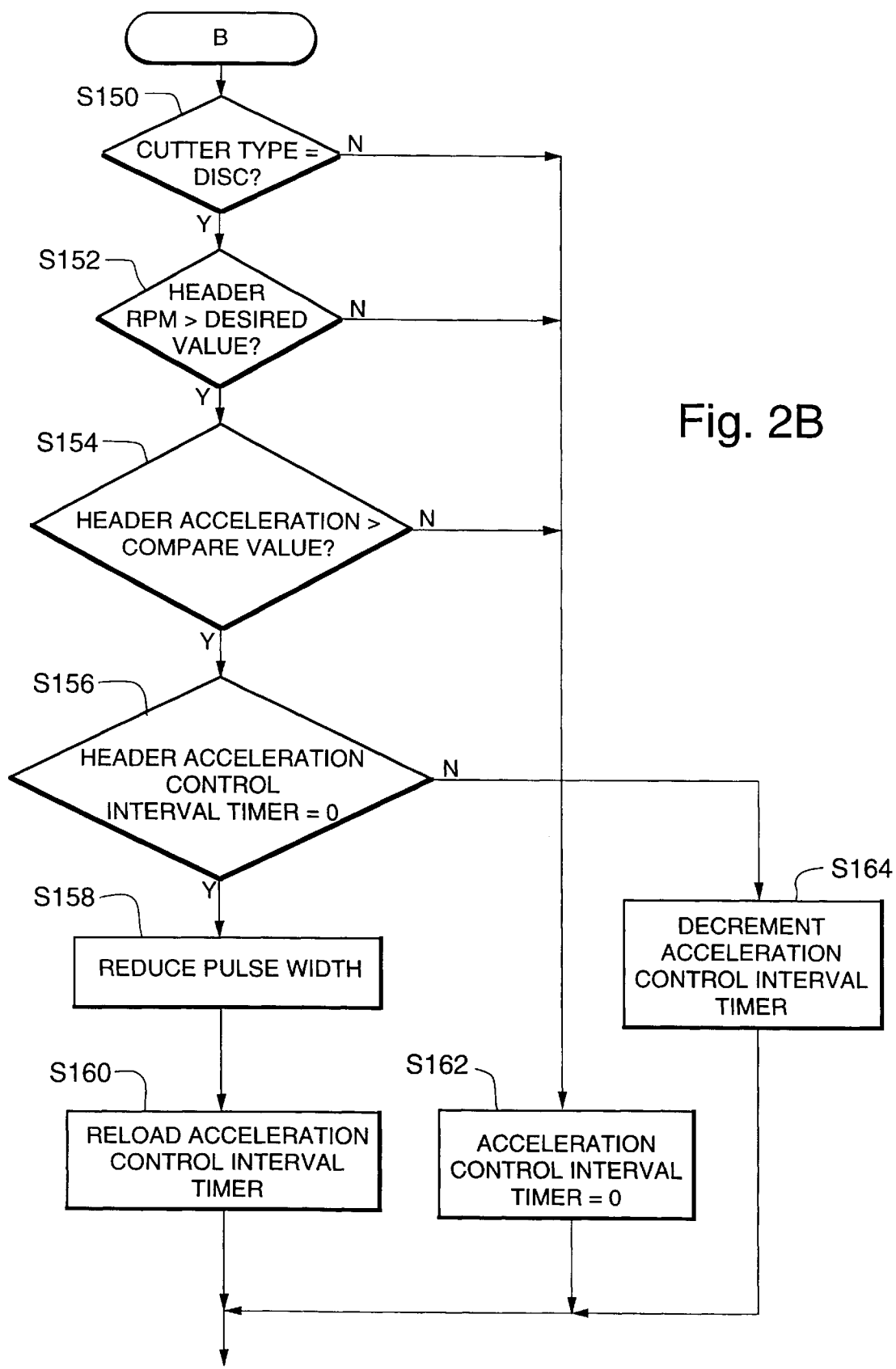

FIGS. 2A and 2B comprise a flow diagram illustrating the part of a main program executed by microprocessor 34 at intervals of about 32.77 milliseconds to develop the header speed control signal on lead 38. At step 100 (S100) the header speed is calculated from the time stamp values saved during the interrupt service routine executed each time sensor 28 senses the leading edge of a hole in wheel 30. Although the header speed may be determined by taking the difference between the time stamp value for the last hole leading edge and the time stamp value for the immediately preceding hole leading edge, S100 preferably averages several (on the order of 10) such determinations to provide a more stable average speed. S100 then determines the acceleration by subtracting the average speed just calculated from the average speed calculated and saved during the last execution of S100. The acceleration is the difference in the average speed values divided by the time (32.77 ms) between executions of S100. S100 saves the average speed value just calculated for use in determining the acceleration the next time S100 is executed.

S100 also calculates the speed of engine 12. An engine speed sensor 40, which may be like the header speed sensor 28, senses holes in a wheel or gear 42 that is secured to linkage 18 so as to rotate therewith. Each time sensor 40 senses the leading edge of a hole in wheel 42, it interrupts microprocessor 34 and the contents of a continuously running counter are saved as a time stamp. S100 calculates the average engine speed from several pairs of time stamps, as is done in calculating header speed.

At S102 the program determines if the average engine speed calculated at S100 is greater than 1300 rpm. For engine speeds less than 1300 rpm the header runs "open loop". That is, the microprocessor produces no control signal to control pump 14 and the pump output flow varies with engine speed, crop loading, temperature, etc. At entry, S102 will determine that the header speed is not greater than 1300 rpm so the program jumps to S150 (FIG. 2B) where it tests a Cutter Type (CT) flag which indicates whether a disk type or sickle bar cutter is in the header 26. The CT flag be set by operating a switch or key on console 36. Alternatively, the flag may be set by an automatic system which recognizes the difference between the duty cycle of the pump control signal required to obtain a given header speed when disk cutters are installed and the duty cycle required to obtain the same header speed when a sickle bar is installed.

The purpose of the flag test at S150 is to divert the program from S152 and the following steps which develop a control signal based on header acceleration. If the cutter is a sickle bar, the closer control based on acceleration is not required. Assuming the header 26 has a sickle bar cutter, the program advances from S150 to S162 where it sets a zero value in an Acceleration Control Interval Timer (A_CIT). A_CIT is used to limit the frequency at which the control signal applied to pump 14 may be modified when the control signal is being modified on the basis of acceleration.

After S162 is executed, the program continues and executes steps necessary to control various actions of the windrower. As long as the engine speed does not exceed 1300 rpm, S100, S102, S150 and S162 are repeated every 32.77 ms. During this time, the microprocessor executes a timed interrupt every 2.25 ms and sends to pump 14 a pulse having a width determined by a pulse width value held in a Duty Cycle Control Register DC_CR. A pulse width value is initially loaded into DC_CR when the operator enters a desired or set point header speed value via console 36. When a set point speed value is entered by an operator, it is saved at a location SET_POINT in addition to being loaded into DC-CR to control the duty cycle or pulse width of the signals applied to pump 14.

When an execution of S102 determines that the engine speed calculated at S100 is greater than 1300 rpm, a test is made at S104 to determine if the header speed falls within a given range of the set point speed. This range or window is chosen to be 240 rpm centered about the set point. As long as the header speed falls within the window, the microprocessor does not vary the control signal applied to pump 14 unless the acceleration in header speed exceeds a predetermined level. S104 compares SET_POINT with the measured header speed calculated at S100, and sets a flag OVERSPEED if the measured speed exceeds the set point speed by more than 120 rpm. Then, SET_POINT is compared with the measured speed and a flag UNDERSPEED is set if SET_POINT exceeds the measured speed by more than 120 rpm.

Assuming that S104 determines that the measured header speed is outside the window, S106 checks an RPM-based Control Interval Timer RPM_CIT. The purpose of RPM_CIT is to time the intervals at which the control signal to pump 14 may change when correction is being made for an overspeed or underspeed condition. RPM_CIT is typically set at S116 to time 1-second intervals if an overspeed condition is to be corrected and is set at S120 to time 2-second intervals when correcting for underspeed. Once set, RPM CIT is decremented each time S112 is executed until it reaches a zero count. Therefore, the first time S106 is executed, it finds that the value in RPM_CIT is zero. S108 then tests the flag OVERSPEED and if this flag is set then the width of the PWM control signal to pump 14 must be shortened. S114 develops a correction factor based on speed error and uses it to update the duty cycle control register DC_CR which controls the duration of the pulses applied to the pump by the microprocessor every 2.25 ms. S114 may be implemented by a table look-up procedure using the value in SET_POINT and the header speed as calculated at S100, the table having stored therein correction values proportional to the speed error.

By way of example only, the minimum correction in pulse width may be 5 $\mu$s corresponding to a speed correction of 50 rpm but these values may vary widely depending on the physical characteristics of the header drive system.

After DC_CR is updated, the timer RPM_CIT is set at S116 to time a one-second interval for applying pulses of the new (shorter) width to pump 14. The program then advances to S150 and, since it is assumed that a sickle bar cutter is in header 26, A_CIT is reset at S162 and the program continues.

Unless the pulses of shorter width have brought the header speed back within the window, on the next execution of the program, S100, S102 and S104 are executed as previously described but the test at S106 finds that RPM_CIT no longer contains a zero value. The program decrements RPM_CIT at S112 and continues through S150 and S162 as previously described. Meanwhile the header should be slowing because of the pulses of shorter width being applied to the pump 14 every 2.25 ms.

If, within the 1-second interval timed by RPM_CIT, the header speed drops back within the window, this is detected at S104. The flag OVERSPEED is cleared and RPM_CIT is reset to zero. The program then advances through S150 and S162 as before. The updated pulse width calculated at S114 is retained in DC_CR to control the pulses applied to the pump 14.

If, within the 1-second interval timed by RPM_CIT, the header speed does not drop back to a value within the window, the value in DC_CR is again updated. After the 1-second interval has elapsed, S106 detects that RPM_CIT contains a zero value. The flag OVERSPEED is still set and when this is detected at S108 the latest values of header speed determined at S100 are used at S114 to calculate a new pulse width value which is entered into DC_CR to control the pulses sent to the pump. RPM_CIT is then set at S116 to time another 1-second interval.

The sequence of operations when an underspeed condition is detected is quite similar to the sequence for an overspeed condition and will not be described in detail. The UNDERSPEED flag set at S104 is tested at S110 and the program advances to S118 to calculate a pulse width value for insertion into DC_CR. The pulse width value is obtained by table look-up in the same manner as for an overspeed condition. However, for a given change in pump control pulse width, the header does not slow at the same rate it accelerates. Therefore, S118 utilizes a second table having therein values different from the values in the table accessed at S114. Furthermore, at S120 RPM_CIT is set to time a 2-second minimum interval during which the pulse width value entered into DC_CR at S118 is effective to control the pulse width. The particular values stored in the tables depend on the physical characteristics of the header and its drive system.

From the foregoing description it is seen that FIG. 2A illustrates an algorithm for developing a control signal based on the speed or rpm of the header. The algorithm is quite satisfactory for controlling header speed when the cutter in the header is a sickle bar. In this case a temporary overspeed condition does not cause crop material to be blown away from the cutter. However, it is less than satisfactory when used alone if the cutter is a rotary disk cutter which will tend to blow the crop away from the knives if the speed is too high. The problem arises in part because of the operation which takes place at S104. The need for a correction in the control signal is not detected until the header is outside the window, that is until the header is already 120 rpm overspeed.

To solve this problem a second algorithm as illustrated in FIG. 2B is implemented in microprocessor 34. This algorithm initiates modification of the pulse width or duty cycle control value present in DC_CR even though the header speed is within the window if (1) the header speed is greater than the set point speed and (2) the header is accelerating at a rate greater than some threshold rate. It does not wait until the header speed has increased above the window.

Each time the program is executed by the microprocessor, and after the appropriate steps in FIG. 2A have been executed, the Cutter Type flag CT is tested. The test is made at S150 and if it indicates that a disk type cutter is in the header 26 the program advances to S152 where the current header speed, calculated at S100, is compared with the desired or set point speed entered by an operator via console 36. If the current header speed is not greater than the set point speed no modification of the pump control signal is required. A_CIT is reset to zero at S162 and the program continues with other control operations.

If S152 determines that the current header speed is greater than the set point speed, S154 is executed to compare the header acceleration, calculated at S100 with a threshold value ACC_THRESH. ACC_THRESH is a constant set at the factory and stored in a non-volatile memory. A typical value of ACC_THRESH might be about 280 rpm/sec. If the acceleration does not exceed ACC_THRESH, no modification of the pump control signal is required. A_CIT is reset to zero at S162 and the program continues with other control operations.

If S154 determines that the header acceleration is greater than ACC_THRESH, S156 is executed to test A_CIT for a zero value. Since A_CIT currently contains a zero value, S158 is executed to decrement the pulse width value in DC_CR by one. The result is that the duty cycle of the control signal applied to pump 14 is shortened by one increment (5 $\mu$sec). This should result in a slowing of the header speed by about 50 rpm over a short period of time.

After the pulse width value in DC_CR is decremented, A_CIT is set at S160 to time a 150 ms interval and the program continues with other operations. The next time the program is executed, the header speed is tested at S152 and if it is still above the set point the acceleration is again tested at S154. If the acceleration is still greater than ACC_THRESH, A_CIT is again tested at S156 for a zero value. A_CIT still contains the representation of 150 ms entered therein at S160 so the program moves to S164 where it decrements A_CIT.

It will be noted that after the reduction of the pulse width value in DC_CR at S158 and the loading of A_CIT at S160, the test of the value in A_CIT at S156 prevents a further reduction of the pulse width value for 150 ms. During this interval, if the header speed drops to the set point speed or the header acceleration drops to ACC_THRESH, the condition is detected at S152 or S154 and A_CIT is reset to zero. Further modification of the pulse width value as a result of header acceleration cannot take place until the header speed again exceeds the set point and the acceleration exceeds ACC_THRESH. On the other hand, if the first reduction of the pulse width value does not result in the reduction of the header speed to the set point speed, or reduction of the header acceleration to ACC_THRESH, the pulse width value may again be reduced after 150 ms when A_CIT has been decremented to zero.

From the foregoing description it is seen that the present invention provides a header speed control system wherein the control signal for controlling the header speed to a set point value is based on both the header speed and the header acceleration so as to provide a more rapid correction of an overspeed condition. Although a preferred embodiment has been specifically described to illustrate the principles of the invention, it will be understood that various modifications and substitutions may be made without departing from the spirit and scope of the invention as defined in the appended claims.

We claim:

1. A header speed control system for controlling the speed of a header in a windrower to a set point speed, said windrower header being capable of alternately carrying a disk cutter or a reel cutter, said system including:

indicator means for indicating whether said header is carrying a disk cutter or a reel cutter;

an engine driving a power source to produce a power output for driving said header;

an engine speed sensor for sensing engine speed and producing an engine speed signal;

a header speed sensor for sensing the speed of the header and producing a header speed signal, and, a controller responsive to said indicater means, said engine speed signal and said header speed signal for developing a control signal to control said power output of said power source, said controller including first means producing, as said control signal, an output signal having a first value to control said power source so that said header is driven at a first set point speed when said engine speed is greater than a threshold value, and second means producing, as said control signal, an output signal having a second value to control said power source so that said header is driven at a second set point speed when said engine speed is less than said threshold value and said indicator means indicates that said header is carrying a disk cutter.

2. A header speed control system as claimed in claim 1 wherein said power source is a variable displacement pump.

3. A header speed control system as claimed in claim 2 wherein said control signal is a pulse width modulated signal.

4. A header speed control system as claimed in claim 2 wherein said controller is a programmable microprocessor programmed to calculate a pulse width value which determines a duty cycle of a pulse width modulated signal that is applied to said variable displacement pump.

5. A header speed control system as claimed in claim 4 wherein said second means includes means responsive to said header speed signal for calculating header acceleration, means for calculating said pulse width value based on the difference between said second set point value and the sensed header speed, means for decrementing the pulse width value when the header acceleration exceeds an acceleration threshold.

6. A header speed control system as claimed in claim 5 wherein said means for decrementing said pulse width value decrements the pulse width value only if the sensed header speed exceeds said second set point value and the header acceleration exceeds said acceleration threshold.

7. A header speed control system as claimed in claim 1 wherein said variable source of drive power is a variable displacement pump and said control signal is a pulse width modulated signal, said variable displacement pump producing an outflow of hydraulic fluid which varies in accordance with a duty cycle of said pulse width modulated signal, said system further comprising at least one hydraulic motor driven by said hydraulic fluid for driving said header.

8. A header speed control system as claimed in claim 1 wherein said controller includes means responsive to said header speed signal for computing header acceleration, means for comparing the calculated header acceleration with a threshold acceleration value if said indicator means indicates that a disk cutter is carried by said header, and means for decreasing said output signal having said second value when the calculated header acceleration exceeds said threshold acceleration.

* * * * *